(12) United States Patent
Okabe et al.

(10) Patent No.: US 11,427,071 B2
(45) Date of Patent: Aug. 30, 2022

(54) MOTOR AND CARRIER VEHICLE

(71) Applicant: NIDEC SERVO CORPORATION, Kiryu (JP)

(72) Inventors: Toshihiro Okabe, Kiryu (JP); Mariko Tanaka, Kiryu (JP); Satoshi Taguchi, Kiryu (JP); Hironobu Yoshikawa, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 421 days.

(21) Appl. No.: 16/732,373

(22) Filed: Jan. 2, 2020

(65) Prior Publication Data

US 2020/0269678 A1    Aug. 27, 2020

(30) Foreign Application Priority Data

Feb. 25, 2019 (JP) .............................. JP2019-031750
Feb. 25, 2019 (JP) .............................. JP2019-031751
Feb. 25, 2019 (JP) .............................. JP2019-031752
Feb. 25, 2019 (JP) .............................. JP2019-031753

(51) Int. Cl.
*B60K 7/00* (2006.01)
*H02K 7/00* (2006.01)
*F16D 1/08* (2006.01)
*H02K 1/18* (2006.01)

(52) U.S. Cl.
CPC .......... *B60K 7/0007* (2013.01); *F16D 1/0876* (2013.01); *H02K 7/003* (2013.01); *H02K 7/006* (2013.01); *H02K 1/187* (2013.01)

(58) Field of Classification Search
CPC .... B60K 2007/0038; B60K 2007/0092; B60K 7/0007; F16D 1/0876; H02K 1/187; H02K 1/2786; H02K 11/215; H02K 11/35; H02K 5/15; H02K 5/1732; H02K 7/003; H02K 7/006; H02K 7/1846
See application file for complete search history.

(56) References Cited

U.S. PATENT DOCUMENTS 7,737,592 B2 * 6/2010 Makino .................. H02K 3/522
                                                    310/156.53

FOREIGN PATENT DOCUMENTS

CN          107776876 B  *  3/2021  ......... B60B 27/0078
WO          2015/133277 A1    9/2015
WO      WO-2015133277 A1  *  9/2015  .......... B60K 17/046

* cited by examiner

*Primary Examiner* — Naishadh N Desai
(74) *Attorney, Agent, or Firm* — Keating & Bennett (57) ABSTRACT

A motor includes a shaft extending along a center axis, and a first groove that is recessed in a radial direction and extends in an axial direction, on an outer side surface of the shaft. The motor includes a stator core into which the shaft is inserted, and a rotation restrictor that is inserted into at least a portion of the first groove and restricts the stator core and the shaft in a circumferential direction. A carrier vehicle is equipped with the motor further including a lead wire extending from the stator. The shaft includes a shaft portion and a flange portion that overhangs to a radially outer side from one side of the shaft portion in the axial direction. The flange portion includes an opening through which the lead wire passes. The opening includes a notch connected to an outer side surface of the flange portion. The opening of the motor is positioned above the center axis.

14 Claims, 7 Drawing Sheets

MOTOR AND CARRIER VEHICLE

CROSS REFERENCE TO RELATED APPLICATION

The present invention claims priority under 35 U.S.C. § 119 to Japanese Application No. 2019-031750 filed on Feb. 25, 2019, Japanese Application No. 2019-031751 filed on Feb. 25, 2019, Japanese Application No. 2019-031752 filed on Feb. 25, 2019 and Japanese Application No. 2019-031753 filed on Feb. 25, 2019, the entire contents of each of which are hereby incorporated herein by reference.

1. FIELD OF THE INVENTION

The present disclosure relates to a motor and a carrier vehicle.

2. BACKGROUND

In in-wheel motors, a shaft and a stator are fixed. For example, a screw member is used for fixing between the shaft and the stator.

Meanwhile, in recent years, there is a demand for reduction in size of an in-wheel motor itself in order to reduce a size and weight of a carrier vehicle to which the in-wheel motor is mounted. When the in-wheel motor is reduced in size, however, it is difficult to secure a space for screwing between the shaft and the stator. Therefore, it is conceivable to fix the shaft and the stator with an adhesive, but there is a risk that a problem may occur in terms of durability and reliability as the adhesive is peeled off due to transmission of a vibration and an impact generated during traveling of the carrier vehicle to the in-wheel motor.

SUMMARY

A motor according to an example embodiment of the present disclosure includes a shaft extending along a center axis, a first groove that is recessed in a radial direction and extends in an axial direction, on an outer side surface of the shaft, a stator core into which the shaft is inserted, and a rotation restrictor that is inserted into at least a portion of the first groove and restricts the stator core and the shaft in a circumferential direction.

A carrier vehicle according to an example embodiment of the present disclosure includes a lead wire extending from a stator in addition to the motor, and the shaft includes a shaft portion and a flange portion overhanging to a radially outer side from one side of the shaft portion in an axial direction. The carrier vehicle includes the motor in which the flange portion has an opening through which the lead wire passes, and the opening further includes a notch connected to an outer side surface of the flange portion. In the carrier vehicle, the opening of the motor is positioned on an upper side of the center axis.

A motor according to an example embodiment of the present disclosure includes a shaft including a shaft portion extending along a center axis, a first groove provided on an outer surface of the shaft so as to extend along the center axis, a stator core including an insertion hole into which the shaft portion of the shaft is inserted, and a rotation restrictor that is inserted into at least the first groove to restrict rotation of the shaft with respect to the stator core.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings. Note that the scope of the present disclosure is not limited to the example embodiments described below, but includes any modification thereof within the scope of the technical idea of the present disclosure. A motor according to an example embodiment of the present disclosure relates to an in-wheel motor to be incorporated in a wheel of a carrier vehicle.

There is a case where scales, numbers, and the like of structures illustrated in the following drawings may differ from those of actual structures, for the sake of easier understanding of the structures. Unless otherwise specified, a direction parallel to a center axis will be simply referred to as an "axial direction", a radial direction having its center on the center axis will be simply referred to as the "radial direction", and a circumferential direction having its center on the center axis, that is, the axial circumference of the center axis, will be simply referred to as the "circumferential direction". In the following description, a "plan view" means a state viewed from the axial direction. In addition, a vertical direction of the carrier vehicle placed on a horizontal plane will be referred to as an "up-down direction", an upper side, which is one side in the up-down direction, will be referred to the "upper side", and a lower side, which is the other side in the up-down direction, will be referred to as the "lower side".

Figure 1:
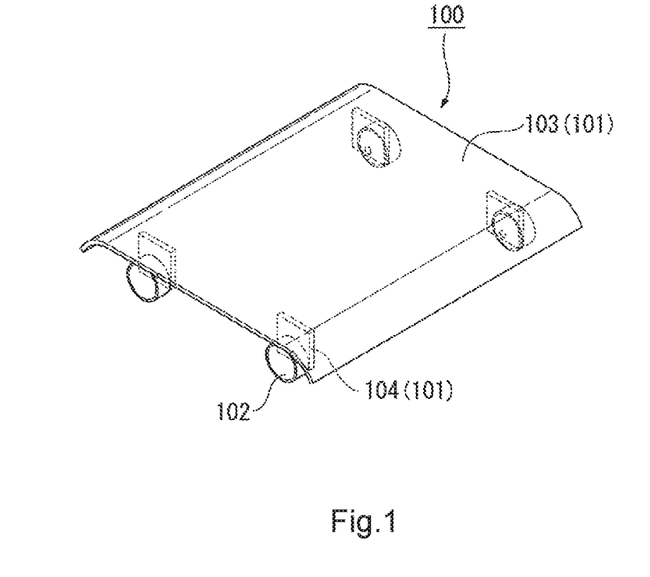
FIG. 1 is a view illustrating an overall configuration of a carrier vehicle.

FIG. 1 is a view illustrating an overall configuration of the carrier vehicle.

As illustrated in FIG. 1, a carrier vehicle 100 includes a main body 101 and a plurality of (for example, four in the present example embodiment) wheels 102 provided on the main body 101. The main body 101 includes a top plate 103 and wheel mounting portions 104 as many as the wheels 102. The top plate 103 is placed on an upper surface on which an object to be carried by the carrier vehicle 100 is placed. The wheels 102 are mounted to the wheel mounting portions 104, respectively. The wheel mounting portion 104 is provided on the lower side of the top plate 103. The wheel mounting portion 104 can swing on the top plate 103 by a suspension (not illustrated).

Figure 2:
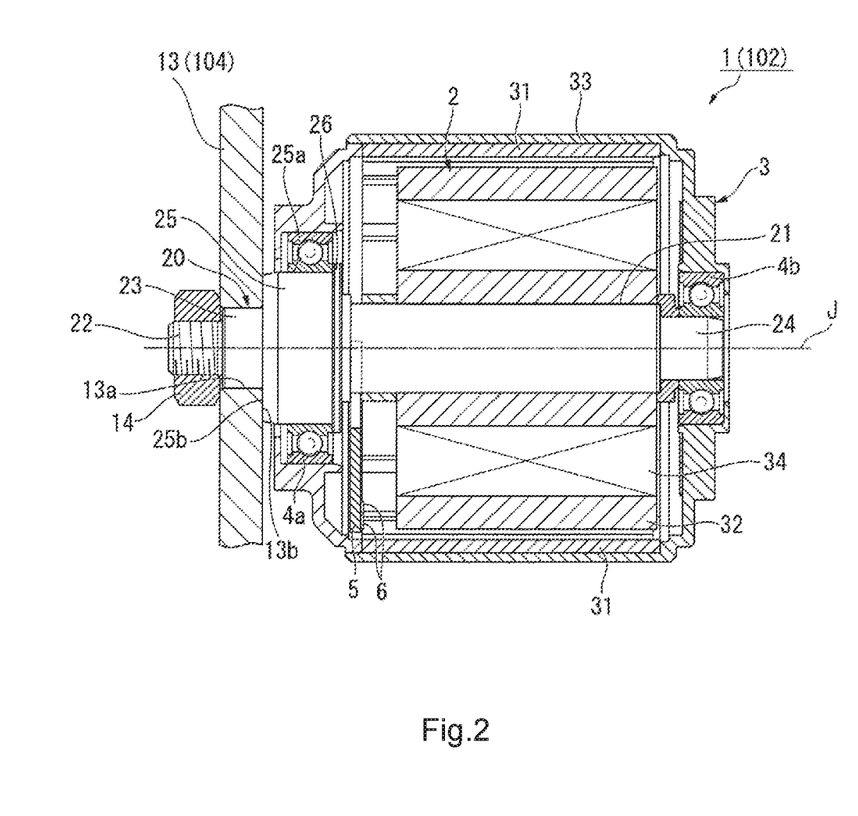
FIG. 2 is a view illustrating a configuration of a main portion of a wheel mounted to a wheel mounting portion.

FIG. 2 is a view illustrating a configuration of a main part of the wheel 102 mounted to the wheel mounting portion 104.

As illustrated in FIG. 2, the wheel mounting portion 104 includes a chassis plate 13. The chassis plate 13 is configured using a plate-shaped metal plate. The chassis plate 13 is provided with a mounting hole 13a for mounting of the wheel 102.

In the present example embodiment, a motor 1 is an outer rotor type motor and is an in-wheel motor to be incorporated in the wheel 102. In the motor 1, a side surface of a rotor functions as a wheel of the wheel 102.

The motor 1 is the outer rotor type motor including a stator 2, a rotor 3, a pair of bearings 4a and 4b, a sensor substrate 5, and a shaft 20 extending along a center axis J. The stator 2 includes a stator core 34 and a plurality of coils 32 mounted to the stator core 34. The center of the shaft 20 coincides with the center axis J. The shaft 20 supports each of the bearings 4a and 4b, which constitute a part of a bearing mechanism, in the axial direction. One end of the shaft 20 is fixed to the chassis plate 13 with a nut 14.

The stator core 34 is formed as a laminated body in which a plurality of plate-shaped bodies are laminated. A plurality of teeth serving as magnetic poles are arranged on an outer circumferential portion of the stator core 34 at predetermined intervals in the circumferential direction. In addition, the coil 32 is wound around an arm portion constituting a magnetic circuit on the inner side of each tooth via an insulator (not illustrated). In this manner, the stator 2 in which the coil 32 is wound around the stator core 34 is configured.

The rotor 3 is supported so as to be rotatable with respect to the stator 2 about the center axis J via the bearings 4a and 4b. The rotor 3 includes: a metallic rotor core 33 which is formed in a substantially tubular shape with a lid whose center is on the center axis J and has magnetism; and a magnet 31 which is provided on the inner side of a side wall (that is, on the inner circumferential side) of the rotor core 33 and arranged to oppose the coil 32 of the stator 2.

The sensor substrate 5 is provided inside the motor 1. Various electronic components are mounted on the surface of the sensor substrate 5 by soldering or the like. For example, a plurality of Hall elements 6 are mounted on a surface 5a, which faces the rotor 3 on one side in the axial direction, of the sensor substrate 5. The Hall element 6 detects a change in magnetic flux leaking from the magnet 31 rotating about the center axis J to detect a rotation angle about the center axis J of the rotor 3.

The shaft 20 includes a shaft portion 21 extending along the center axis J. The shaft 20 further includes a flange portion 25. The flange portion 25 is provided to overhang to the radially outer side of the shaft portion 21 of the shaft 20. In the present example embodiment, the flange portion 25 is formed integrally with the shaft portion 21, but the flange portion 25 and the shaft portion 21 may be configured separately and joined to form the shaft 20.

The shaft 20 further includes: a threaded portion 22 provided on the one side in the axial direction; an insertion portion (connecting portion) 23; and a bearing holding portion 24 provided on the other side in the axial direction. The threaded portion 22 is provided at one distal end of the shaft 20 in the axial direction, and a female screw is formed on an outer circumferential surface of the threaded portion 22. The shaft 20 is fixed to the chassis plate 13 by mounting the nut 14 to the female screw of the threaded portion 22.

The insertion portion 23 is a portion that connects the threaded portion 22 and the flange portion 25 and is configured using a part of the shaft portion 21. The insertion portion 23 is inserted into the mounting hole 13a of the chassis plate 13. An axial length of the insertion portion 23 corresponds to a thickness of the chassis plate 13, that is, a depth of the mounting hole 13a.

The bearing holding portion 24 is provided at the other distal end of the shaft 20 in the axial direction, and holds the bearing 4b on an outer circumferential surface of the bearing holding portion 24. The bearing holding portion 24 has a smaller outer diameter than the shaft portion 21.

The flange portion 25 has a first surface 25b configured using a flat surface. The first surface 25b is a surface, close to the threaded portion 22 in the axial direction, of the flange portion 25. The flange portion 25 holds the bearing 4a on an outer surface 25a. The flange portion 25 has a collar portion 26 on the other side in the axial direction. The collar portion 26 is provided along the circumferential direction of the outer surface 25a of the flange portion 25, and overhangs to the radially outer side from the outer surface 25a. The collar portion 26 is in contact with the other side surface of the bearing 4a in the axial direction. In the present example embodiment, the flange portion 25 functions as a guide member that guides the bearing 4a.

Conventionally, an in-wheel motor has been mounted to a carrier vehicle by screwing a shaft to a chassis. In recent years, there is a demand for reduction in size of the in-wheel motor to be mounted to the carrier vehicle in order to reduce a size and weight of the carrier vehicle itself. When the in-wheel motor is reduced in size, however, it is difficult to secure a space for screwing.

Therefore, it is also possible to consider a method of mounting a motor to a carrier vehicle by forming a female screw on one side of a shaft and tightening the shaft itself using a nut. However, for example, if a tightening force of the nut is excessively greater than a crimping force between the shaft and the motor body at the time of mounting the motor, there is a risk that the shaft may come off from the motor body to cause problems such as malfunction.

In contrast, the motor 1 according to the present example embodiment includes the shaft 20 having the flange portion 25 integrated with the shaft portion 21. The flange portion 25 has the first surface 25b on the threaded portion 22 side configured as a flat surface.

As a result, when the nut 14 is tightened at the time of mounting the shaft 20 to the chassis plate 13 as described above, a force to pull not only the shaft portion 21 but also the flange portion 25 integrated with the shaft portion 21 toward the chassis plate 13 is applied to the shaft 20. As a result, an end surface of the flange portion 25 comes into contact with the surface of the chassis plate 13 in the shaft 20. That is, the shaft 20 is fixed to the chassis plate 13 in a state where the first surface 25b, which is the flat surface, is in surface-contact with a surface 13b of the chassis plate 13.

Therefore, the first surface 25b of the flange portion 25 integrated with the shaft portion 21 comes into surface-contact with the surface 13b of the chassis plate 13 to restrict the movement toward the nut 14 according to the motor 1 of the present example embodiment. Thus, even if the nut 14 is excessively tightened, the shaft 20 is not pulled by the nut 14 and does not come out of the motor body (the stator 2). Accordingly, it is possible to suppress the occurrence of problems such as malfunction caused by removal of the shaft due to the excessive tightening of the nut 14 at the time of mounting the motor 1.

Figure 3:
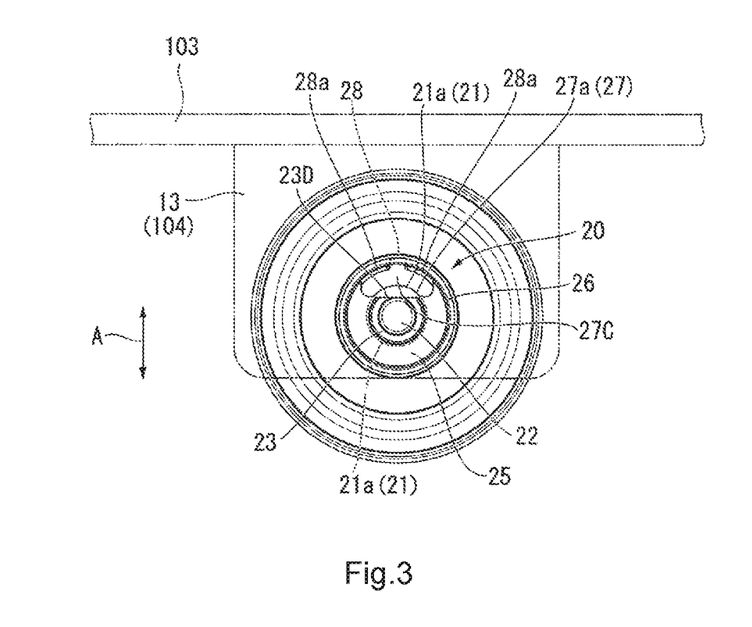
FIG. 3 is a plan view of FIG. 2 from one side in the axial direction.
Figure 4:
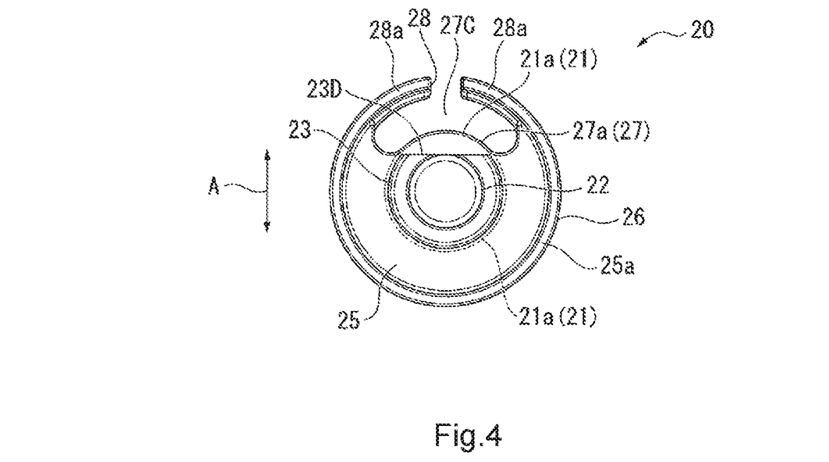
FIG. 4 is a plan view illustrating a configuration of a shaft in a plan view from the one side in the axial direction.

FIG. 3 is a view illustrating the configuration of FIG. 2 in a plan view from one side in the axial direction. In FIG. 3, the up-down direction of the carrier vehicle 100 coincides with a direction of double-headed arrow A. FIG. 4 is an enlarged view of a main part of the shaft 20 in a plan view from the one side in the axial direction. In FIG. 4, the direction of double-headed arrow A coincides with the up-down direction of the carrier vehicle 100.

As illustrated in FIGS. 3 and 4, an outer shape of the flange portion 25 is circular. The flange portion 25 includes an opening 27 and a notch 28. The opening 27 is provided in the state of penetrating the flange portion 25 in the axial direction, and at least a radially inner side of the opening 27 has a shape following an outer surface 21a of the shaft portion 21.

At least a part of a radially inner opening end 27a of the opening 27 is flush with the outer surface 21a of the shaft portion 21. In the present example embodiment, the opening 27 has an oval shape curved along the circumferential direction. A lead wire extending from the stator 2 side passes through the opening 27 as will be described later. The lead wire is led out from the inside to the outside of the motor 1 through the opening 27. Note that a size of the opening 27 is appropriately designed according to the number and thickness of lead wires extending from the stator 2 side.

The notch 28 is provided in a part of the outer surface 25a of the flange portion 25, and is connected to the opening 27 in the radial direction. The notch 28 is provided so as to cut out the entire flange portion 25 in the axial direction. The opening 27 is in communication with the outside through the notch 28.

The insertion portion 23 has a substantially D-shaped planar shape in which a part of the upper side of a circular outer edge portion is cut into a straight line. That is, a cross section perpendicular to the center axis J of the insertion portion 23 has a non-circular shape. The insertion portion 23 is inserted into the mounting hole 13a of the chassis plate 13 as described above. An inner surface shape of the mounting hole 13a corresponds to an outer shape of the insertion portion 23. Since each of the insertion portion 23 and the mounting hole 13a has the non-circular shape in the motor 1 of the present example embodiment, the shaft 20 is mounted to the chassis plate 13 in the state of being restricted from rotating about the center axis J. Note that the planar shape of the insertion portion 23 is not limited to the above-described D shape as long as the rotation of the shaft 20 with respect to the chassis plate 13 can be restricted.

Meanwhile, the shaft and the stator are fixed by, for example, screwing in the conventional in-wheel motor. When the in-wheel motor is reduced in size, however, it is difficult to secure a space for screwing.

Therefore, it is conceivable to fix the shaft and the stator with an adhesive, but there is a risk that a problem may occur in terms of durability and reliability as the adhesive is peeled off due to transmission of a vibration and an impact generated during traveling of the carrier vehicle to the in-wheel motor.

On the other hand, the motor 1 of the present example embodiment is excellent in durability and reliability by adopting the following configuration to fix the stator 2 and the shaft 20 favorably. Hereinafter, a mounting structure of the stator core 34 and the shaft 20 will be described.

Figure 5:
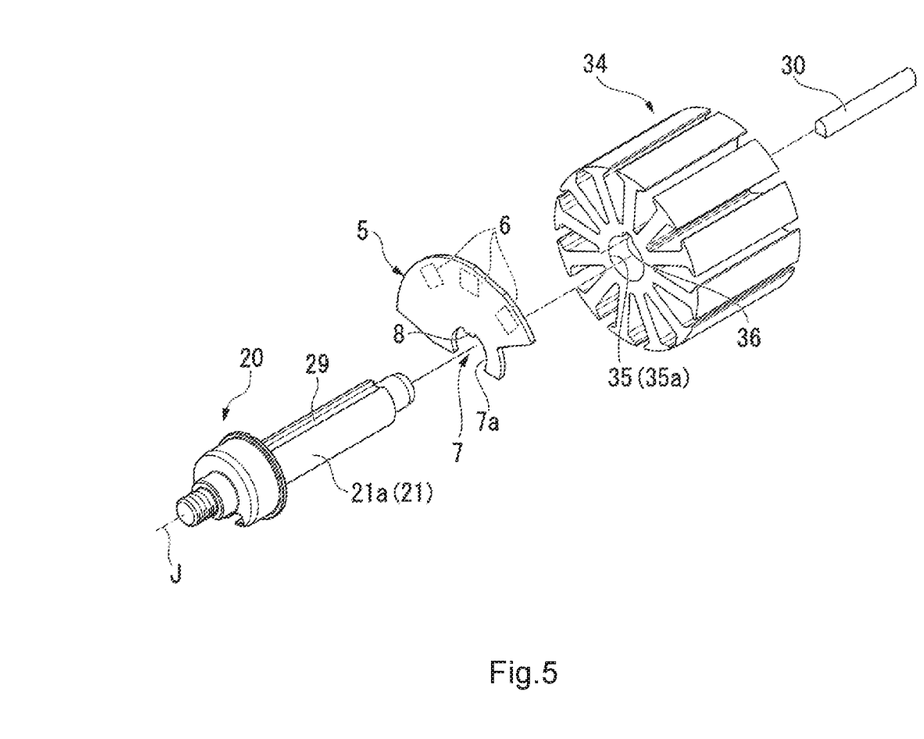
FIG. 5 is an exploded view illustrating a mounting structure of a stator core and the shaft.

FIG. 5 is an exploded view illustrating the mounting structure of the stator core 34 and the shaft 20. As illustrated in FIG. 5, the shaft 20 has a first groove 29 provided on the outer surface 21a of the shaft portion 21 so as to extend along the center axis J. The stator core 34 has an insertion hole 35 into which the shaft portion 21 of the shaft 20 is inserted, and a second groove 36 provided on an inner circumferential surface 35a of the insertion hole 35 along the axial direction.

In the motor 1 of the present example embodiment, the stator core 34 and the shaft 20 are fixed by a pin 30. The shaft portion 21 of the shaft 20 is inserted into the insertion hole 35 in a state where circumferential positions of the first groove 29 and the second groove 36 coincide with each other. The pin 30 is fixed in a state where the rotation in the circumferential direction of the shaft 20 with respect to the stator core 34 is restricted by being inserted into the first groove 29 and the second groove 36.

In the present example embodiment, a dimension of the pin 30 in the axial direction is the same as a dimension of the insertion hole 35 in the axial direction. The second groove 36 is provided in the entire insertion hole 35 in the axial direction. As a result, the pin 30 is inserted into the second groove 36 to fix the shaft portion 21 of the shaft 20 over the entire insertion hole 35 in the axial direction. As described above, the pin 30 functions as a rotation restricting member that restricts the rotation of the shaft 20 with respect to the stator core 34. Note that the dimension of the pin 30 in the axial direction may be shorter than the dimension of the insertion hole 35 in the axial direction.

A shape of the pin 30 is formed so as to correspond to a hole shape constituted by the first groove 29 and the second groove 36. In the present example embodiment, an inner surface of the first groove 29 is configured using a flat surface, and an inner surface of the second groove 36 is configured using a curved surface. In the pin 30 of the present example embodiment, a cross section of a portion inserted into the first groove 29 has a substantially rectangular shape, and a cross section of a portion inserted into the second groove 36 has a substantially circular shape. Note that it is sufficient for the pin 30 to have the function as the rotation restricting member, and the shape of the pin 30 is not limited to the above-described shape. For example, the pin 30 may have a cylindrical shape or a prismatic shape. In this case, the shapes of the first groove 29 and the second groove 36 change in accordance with the shape of the pin 30.

Since the stator core 34 and the shaft 20 can be favorably fixed using the pin 30 according to the motor 1 of the present example embodiment, there is no peeling-off of the adhesive due to the transmission of the vibration and the impact generated during traveling of the carrier vehicle 100 to the motor 1 as in the case where the shaft and the stator are fixed with the adhesive. Accordingly, the durability is excellent by preventing occurrence of a problem such as disconnection of the lead wire, which will be described later, led out from the coil 32 wound around the stator core 34 due to the rotation of the shaft 20 with respect to the stator core 34. Since the stator core 34 and the shaft 20 can be fixed at low cost using the pin 30, manufacturing cost of the stator 2 can be reduced.

The sensor substrate 5 is held on the shaft 20. The sensor substrate 5 is provided between the stator 2 and the flange portion 25 in the axial direction. The sensor substrate 5 has a plate shape perpendicular to the center axis J. The sensor substrate 5 has a recess 7 and a protrusion 8. The recess 7 has a shape that is recessed to the radially inner side so as to follow the outer surface 21a of the shaft portion 21 of the shaft 20. The protrusion 8 extends to the radially inner side from a circumferential central portion of an outer edge 7a of the recess 7. The center of the outer edge 7a of the recess 7 is positioned on the center axis J.

Since the stator core 34 and the shaft 20 can be favorably fixed using the pin 30 according to the motor 1 of the present example embodiment, there is no peeling-off of the adhesive due to the transmission of the vibration and the impact generated during traveling of the carrier vehicle 100 to the motor 1 as in the case where the shaft and the stator are fixed with the adhesive. Accordingly, the durability is excellent by preventing occurrence of a problem such as disconnection of the lead wire, which will be described later, led out from the coil 32 wound around the stator core 34 due to the rotation of the shaft 20 with respect to the stator core 34. Since the stator core 34 and the shaft 20 can be fixed at low cost using the pin 30, manufacturing cost of the stator 2 can be reduced.

The sensor substrate 5 is held on the shaft 20. The sensor substrate 5 is provided between the stator 2 and the flange portion 25 in the axial direction. The sensor substrate 5 has a plate shape perpendicular to the center axis J. The sensor substrate 5 has a recess 7 and a protrusion 8. The recess 7 has a shape that is recessed to the radially inner side so as to follow the outer surface 21a of the shaft portion 21 of the shaft 20. The protrusion 8 extends to the radially inner side from a circumferential central portion of an outer edge 7a of the recess 7. The center of the outer edge 7a of the recess 7 is positioned on the center axis J. In the sensor substrate 5, the plurality of Hall elements 6 are arranged on the radially outer side of the recess 7 at intervals in the circumferential direction about the center axis J. In the present example embodiment, a total of three Hall elements 6 are arranged about the center axis J at intervals of 60°. Note that the arrangement interval of the Hall elements 6 is not limited to 60°.

The shaft 20 holds the sensor substrate 5 by inserting the shaft portion 21 into the recess 7. More specifically, the shaft portion 21 of the shaft 20 is inserted into the recess 7 in a state where the protrusion 8 is fitted into the first groove 29 in the sensor substrate 5. The sensor substrate 5 is restricted from rotating in the circumferential direction with respect to the shaft 20. Since positional deviation of the sensor substrate 5 in the circumferential direction is reduced, it is possible to obtain high detection accuracy. In addition, it is possible to improve the assemblability of the motor 1 using the shaft 20 for positioning of the sensor substrate 5.

Figure 6:
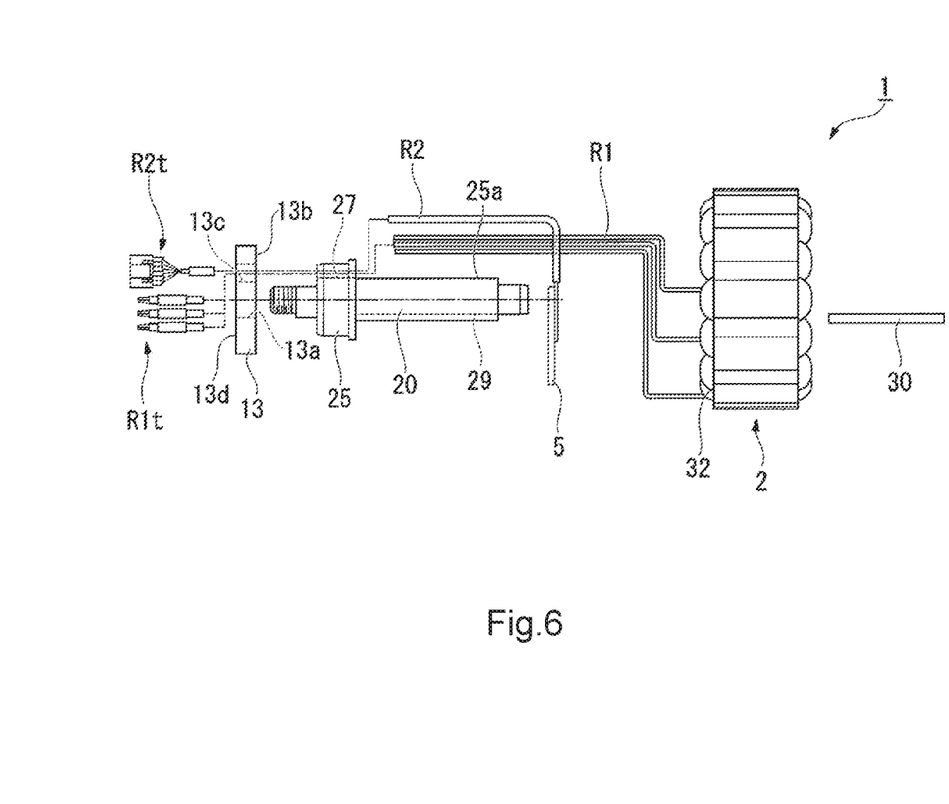
FIG. 6 is an exploded view illustrating a configuration of a main portion of a motor.

FIG. 6 is an exploded view illustrating a configuration of a main part of the motor 1. FIG. 6 illustrates a peripheral configuration of the stator 2 among components of the motor 1.

As illustrated in FIG. 6, the stator 2 includes a lead wire R1 led out from the coil 32. The lead wire R1 is directly connected to the coils 32 of a U-phase, a V-phase, and a W-phase in the stator 2. The lead wire R1 includes a connector R1t at a distal end. The sensor substrate 5 includes a lead wire R2 that outputs a detection result of the Hall element 6 to the outside. The lead wire R2 includes a connector R2t at a distal end.

Since the motor 1 of the present example embodiment is the outer rotor type, it is necessary to lead out the above lead wires R1 and R2 connecting the inside and the outside of the motor from a different site from the rotor 3 where there is no influence by the rotation of the motor 1. For example, if the motor is large, it is also possible to cause a wiring to pass through the inside of the shaft and lead out the wiring up to the outside.

However, when the in-wheel motor is reduced in size, there is no space to allow the wiring to pass through the inside of the shaft. Even if it is possible to allow the wiring to pass through the inside of the shaft, it is necessary to connect a connector after causing the wiring to pass through the inside of the shaft when there is no space for passage of the connector, so that assembly time of the motor is extended and the productivity decreases.

On the other hand, the motor 1 of the present example embodiment can easily lead out the lead wires R1 and R2 to the outside of the motor 1 via the opening 27 and the notch 28 provided in the flange portion 25 of the shaft 20. The lead wires R1 and R2 are led out to the one side in the axial direction (toward the threaded portion 22) along the outer surface 21a of the shaft portion 21 of the shaft 20. Since the opening 27 and the notch 28 provided in the flange portion 25 also function as references for assembly positions of the respective parts (the coil 32 and the stator core 34) with respect to the shaft portion 21 of the shaft 20, it is possible to improve the assemblability of the motor 1.

In the present example embodiment, the inside of the opening 27 communicates with the outside via the notch 28 as illustrated in FIGS. 3 and 4. Thus, the lead wires R1 and R2 can be arranged inside the opening 27 from the radially outer side via the notch 28.

Therefore, according to the motor 1 of the present example embodiment, it is possible to cause the lead wires R1 and R2 to pass through the inside of the opening 27 via the notch 28 without causing the connectors R1t and R2t to pass through the opening 27 so that the shaft 20 can be pulled out to the one side in the axial direction even if the sizes of the connectors R1t and R2t provided at the distal ends of the lead wires R1 and R2 are larger than the size of the opening 27.

Since at least a part of the radially inner opening end 27a of the opening 27 is flush with the outer surface 21a of the shaft portion 21 in the shaft 20 of the present example embodiment, there is no step between the outer surface 21a and an inner surface of the opening 27. Thus, occurrence of problems, such as bending by the step generated between the opening 27 and the outer surface 21a and damage by a corner of the step, is suppressed in the lead wires R1 and R2 led out to the opening 27 along the outer surface 21a of the shaft portion 21. Therefore, the occurrence of disconnection at the lead wires R1 and R2 can be suppressed.

As illustrated in FIG. 4, the flange portion 25 has a thin portion 28a having a small thickness in the radial direction. The thin portion 28a is divided into two parts by the notch 28. In the present example embodiment, the notch 28 is positioned at the center of the opening 27 in the circumferential direction, circumferential lengths of the two thin portions 28a are substantially equal.

Here, a case where the notch 28 deviates from the center of the opening 27 in the circumferential direction is considered. In this case, a circumferential length of one of the thin portions 28a is longer than the circumferential length of each of the thin portions 28a in the case where the notch 28 is provided at the center in the circumferential direction. If the circumferential length of the thin portion 28a is longer than necessary, the mechanical strength of the flange portion 25 decreases. As a difference occurs between the circumferential lengths of the two thin portions 28a, the mechanical strength balance also deteriorates.

On the other hand, according to the shaft 20 of the present example embodiment, the circumferential lengths of the two thin portions 28a can be aligned by positioning the notch 28 at the center of the opening 27 in the circumferential direction. As a result, it is possible to suppress the decrease in the mechanical strength of the flange portion 25 occurring when the circumferential length of the thin portion 28a is longer than necessary. In addition, the strength balance in the circumferential direction of the flange portion 25 can be stabilized by aligning the circumferential lengths of the two thin portions 28a.

The lead wires R1 and R2 led to the one side of the shaft 20 in the axial direction via the opening 27 are led out to a rear surface 13d side of the chassis plate 13 via a through-hole 13c provided in the chassis plate 13. The connectors R1t and R2t of the lead wires R1 and R2 led out to the rear surface 13d of the chassis plate 13 are electrically connected to, for example, a control board provided on the lower side of the top plate 103 (not illustrated).

As illustrated in FIG. 3, the motor 1 of the present example embodiment is fixed to the chassis plate 13 of the carrier vehicle 100 in the state where the opening 27 provided in the flange portion 25 is positioned on the top plate 103 side of the main body 101. The opening 27 provided in the flange portion 25 is positioned on the upper side of the center axis J.

More specifically, the motor 1 of the present example embodiment is mounted to the main body 101 (the chassis plate 13) such that a distance between the opening 27 and the top plate 103 is minimized. Here, the distance between the opening 27 and the top plate 103 means a distance from a center 27C of the opening 27 to the surface of the top plate 103. In the motor 1 of the present example embodiment, the shaft 20 is mounted to the main body 101 such that the opening 27 provided in the flange portion 25 is positioned on the uppermost side, that is, positioned at a place farthest from the ground.

Since the rotor 3 functions as the wheel of the wheel 102 in the motor 1 used as the in-wheel motor, an impact and a vibration from the ground are directly transmitted. At that time, when a load is applied from the ground, an external force is applied to the shaft 20 which is a fixed portion of the motor 1 with respect to the chassis plate 13.

Here, for example, a case where the shaft 20 is fixed to the chassis plate 13 such that the opening 27 of the flange portion 25 is positioned on the lower side of the center axis J is considered as a comparative example. That is, the case where the motor 1 is fixed to the chassis plate 13 such that the opening 27 and the notch 28 are arranged at positions opposing the ground is considered.

When the opening 27 and the notch 28 are arranged at the positions opposing the ground in this manner, a force is applied to a lower portion of the flange portion 25, that is, a portion where the opening 27 and the notch 28 are provided in the flange portion 25 if the motor 1 receives the load from the ground. Since the portion where the opening 27 and the notch 28 are provided has low mechanical strength, there is a risk that an external shape may be distorted by an external force, and the external shape may be deformed from a circular shape. If the outer shape of the flange portion 25 is distorted from the circular shape, the bearing 4a held by the flange portion 25 becomes difficult to rotate, and thus, there is a risk that a rotation failure of the motor 1 may occur.

On the other hand, the shaft 20 is fixed to the chassis plate 13 in the state where the opening 27 of the flange portion 25 is positioned on the upper side of the center axis J in the carrier vehicle 100 of the present example embodiment. More specifically, the motor 1 of the present example embodiment is mounted to the chassis plate 13 such that the distance from the opening 27 to the top plate 103 is minimized.

Thus, when the motor 1 receives the load from the ground in the carrier vehicle 100 of the present example embodiment, the external force is applied to a lower portion of the flange portion 25, that is, a portion where the opening 27 and the notch 28 are not provided in the flange portion 25. The portion where the opening 27 and the notch 28 are not provided has relatively high mechanical strength as compared with a portion where the opening 27 and the notch 28 are provided, and thus, is not easily affected by the external force. Thus, it is possible to suppress the occurrence of the rotation failure of the motor 1 due to the deformation of the flange portion 25 generated when the outer shape is distorted by the external force.

Since the notch 28 is provided at the center of the opening 27 in the circumferential direction as described above in the motor 1 of the present example embodiment, the circumferential lengths of the two thin portions 28a can be aligned. Accordingly, it is possible to suppress the decrease in the mechanical strength of the flange portion 25 generated when the notch 28 is provided and to stabilize the strength balance in the circumferential direction of the flange portion 25. Therefore, the durability of the motor 1 can be further improved by further suppressing the deformation of the flange portion 25 described above.

As described above, the stator core 34 and the shaft 20 can be favorably fixed by the pin 30 serving as the rotation restricting member according to the motor 1 of the present example embodiment, and thus, the adhesive is not peeled off due to the vibration and the impact during traveling of the carrier vehicle 100 as in the case where the shaft 20 and the stator 3 are fixed with the adhesive. The disconnection of the lead wire caused by the rotation of the shaft 20 with respect to the stator core 34 can be suppressed. Since the pin 30 is used to fix the stator core 34 and the shaft 20 according to the motor 1 of the present example embodiment, the device configuration can be reduced in size.

Therefore, the motor 1 of the present example embodiment has a small size and excellent reliability.

According to the motor 1 of the present example embodiment, the rotation restricting member is configured using the pin 30, the stator core 34 further includes the second groove 36 provided on the inner circumferential surface 35a of the insertion hole 35, and the pin 30 is inserted into the first groove 29 and the second groove 36. Thus, the stator core 34 and the shaft 20 can be easily fixed.

Since the sensor substrate 5 that detects the magnetic flux from the rotor 3 rotating about the center axis J is held on the shaft portion 21 according to the motor 1 of the present example embodiment, it is possible to improve the assemblability of the motor 1 by using the shaft 20 for positioning of the sensor substrate 5.

Since the sensor substrate 5 includes the recess 7 having the inner surface shape that follows the outer surface of the shaft portion 21 and the protrusion 8 extending to the radially inner side from the inner surface 7a of the recess 7 according to the motor 1 of the present example embodiment, the sensor substrate 5 can be easily fixed to the shaft portion 21 of the shaft 20 as described above.

Although one example embodiment of the present disclosure has been described above, the structures described in the example embodiment and the combinations of the elements are merely examples, and therefore addition, omission, substitution and other alterations may be appropriately made within the scope of the present disclosure. In addition, the present disclosure is not limited by the example embodiment.

Figure 7:
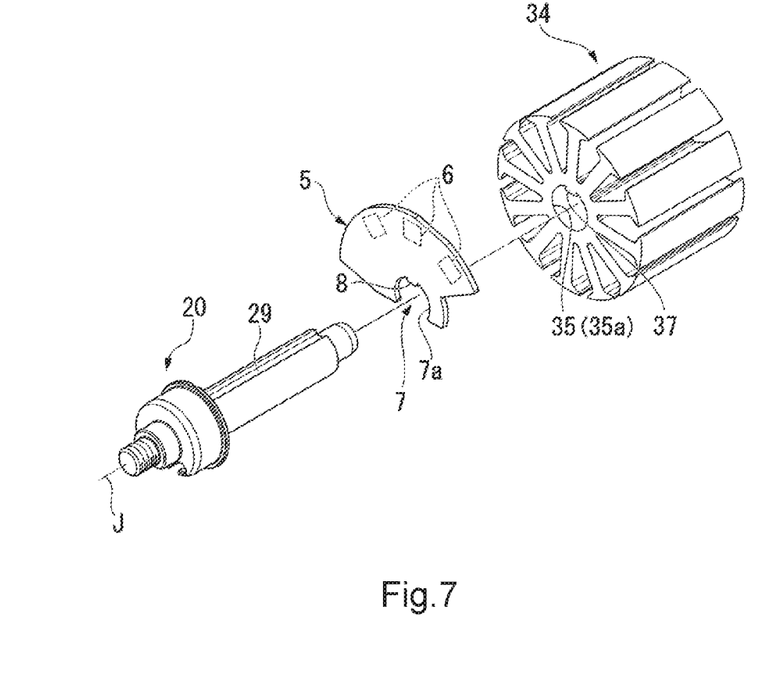
FIG. 7 is a view illustrating a configuration of a stator core according to a modification.

For example, the case where the pin 30 is used as the rotation restricting member of the shaft 20 with respect to the stator core 34 has been taken as an example in the above-described example embodiment, the rotation restricting member is not limited to the pin 30. FIG. 7 is a view illustrating a configuration of a stator core according to a modification. As illustrated in FIG. 7, the stator core 34 according to the modification has a columnar member 37 provided on the inner circumferential surface 35a of the insertion hole 35 into which the shaft portion 21 of the shaft 20 is inserted.

In the present modification, the stator core 34 and the shaft 20 are fixed by the columnar member 37. The shaft portion 21 of the shaft 20 is inserted into the insertion hole 35 in a state where circumferential positions of the first groove 29 and the columnar member 37 coincide with each other. The columnar member 37 is fixed in a state where the rotation in the circumferential direction of the shaft 20 with respect to the stator core 34 is restricted by being inserted into the first groove 29.

The columnar member 37 is provided over the entire insertion hole 35 in the axial direction. Thus, the columnar member 37 can fix the shaft portion 21 of the shaft 20 over the entire insertion hole 35 in the axial direction. In this manner, the columnar member 37 functions as the rotation restricting member that restricts the rotation of the shaft 20 with respect to the stator core 34.

According to the configuration of the present modification, the stator 2 can be assembled by a simple process of inserting the shaft 20 into the stator core 34. Therefore, the manufacturing cost of the stator 2 can be reduced.

Although the case where at least the radially inner side of the opening 27 has the shape that follows the outer surface 21a of the shaft portion 21 has been taken as an example in the above-described example embodiment, the present disclosure is not limited thereto, and the opening 27 may have a shape whose radially inner side does not follow the outer surface 21a of the shaft portion 21 as long as the lead wire R1 and R2 can be led out.

Although the case where the opening 27 has the oval shape curved along the circumferential direction has been taken as an example in the above-described example embodiment, the present disclosure is not limited thereto, and the opening 27 may have, for example, a rectangular shape, an elliptical shape, a circular shape, or a triangular shape as long as the lead wires R1 and R2 can be led out.

Since the in-wheel motor adopts the outer rotor type, it is necessary to cause the lead wire connecting the inside and outside of the motor to pass through the site not affected by the rotation of the motor. For example, when the motor is large, it is possible to lead out a wiring to the outside through the inside of the shaft.

Meanwhile, in recent years, there is a demand for reduction in size of an in-wheel motor itself in order to reduce a size and weight of a carrier vehicle to which the in-wheel motor is mounted. When the in-wheel motor is reduced in size, however, there is a risk that it is difficult to cause the wiring to pass through the inside of the shaft. Even if it is possible to allow the wiring to pass through the inside of the shaft, it is necessary to connect a connector after causing the wiring to pass through the inside of the shaft when there is no space for passage of the connector, so that assembly time of the motor is extended and the productivity decreases.

A motor according to an example embodiment of the present disclosure includes: a stator; a shaft including a shaft portion extending along a center axis; a flange portion provided to overhang to a radially outer side of the shaft portion of the shaft and having an opening through which a lead wire extending from the stator passes; and a notch provided in the flange portion and connected to the opening in a radial direction.

A shape of the pin 30 is formed so as to correspond to a hole shape constituted by the first groove 29 and the second groove 36. In the present example embodiment, an inner surface of the first groove 29 is configured using a flat surface, and an inner surface of the second groove 36 is configured using a curved surface. In the pin 30 of the present example embodiment, a cross-sectional shape of a portion inserted into the first groove 29 is substantially rectangular, and a cross-sectional shape of a portion inserted into the second groove 36 is substantially circular. Note that it is sufficient for the pin 30 to have the function as the rotation restricting member, and the shape of the pin 30 is not limited to the above-described shape. For example, the pin 30 may have a cylindrical shape or a prismatic shape. In this case, the shapes of the first groove 29 and the second groove 36 change in accordance with the shape of the pin 30.

Since the shaft 20 including the flange portion 25 provided with the opening 27 and the notch 28 configured to lead out the lead wires R1 and R2 is provided according to the motor 1 of the present example embodiment as described above, the motor 1 has a small size and the lead wires R1 and R2 can be easily led out so that the productivity becomes high.

Since at least the radially inner side of the opening 27 has the shape that follows the outer surface 21a of the shaft portion 21 according to the motor 1 of the present example embodiment, the lead wires R1 and R2 are not bent due to the step generated between the opening 27 and the outer surface 21a or damaged by the corner of the step.

Since the opening 27 has the oval shape curved along the circumferential direction according to the motor 1 of the present example embodiment, the lead wires R1 and R2 extending from the stator 2 side can be favorably led out to the outside.

Since the notch 28 is positioned at the center of the opening 27 in the circumferential direction according to the motor 1 of the present example embodiment, the circumferential lengths of the two thin portions 28a can be made substantially equal. As a result, the circumferential lengths of the two thin portions 28a are aligned, and thus, the strength balance in the circumferential direction of the flange portion 25 can be stabilized.

In the related art, an in-wheel motor is usually fixed to a vehicle by screwing.

Meanwhile, in recent years, there is a demand for reduction in size of an in-wheel motor itself in order to reduce a size and weight of a carrier vehicle to which the in-wheel motor is mounted. When the in-wheel motor is reduced in size, however, it is difficult to secure a space for screwing. Therefore, it is conceivable to mount the motor to the vehicle by forming a female screw on one side of a shaft and tightening the one side of the shaft using a nut. However, for example, if the nut is excessively tightened more than a crimping force between the shaft and the motor body at the time of mounting to the vehicle, there is a risk that the shaft may come off from the motor body to cause problems such as malfunction.

A motor according to an example embodiment of the present disclosure includes: a stator; a shaft including a shaft portion extending along a center axis; a rotor rotating about the center axis; a flange portion provided integrally with the shaft and overhanging to a radially outer side from an outer circumferential surface of the shaft portion; and a threaded portion provided on one side of the shaft in an axial direction. A surface, close to the threaded portion, of the flange portion is a flat surface.

As described above, the shaft 20 in which the first surface 25b, close to the chassis plate 13, of the flange portion 25 integrated with the shaft portion 21 is configured using the flat surface is provided according to the motor 1 of the present example embodiment. As a result, when the nut 14 is tightened at the time of mounting the shaft 20 to the chassis plate 13, the shaft 20 is fixed to the chassis plate 13 in the state where the first surface 25b of the flange portion 25 is in surface-contact with the surface 13b of the chassis plate 13. Since the first surface 25b of the flange portion 25 integrated with the shaft portion 21 comes into surface-contact with the surface 13b of the chassis plate 13 to restrict the movement toward the nut 14 according to the motor 1 of the present example embodiment, the shaft 20 is not pulled by the nut 14 and does not come out of the motor body (stator 2) even if the nut 14 is tightened excessively. Therefore, it is possible to provide the motor 1 that has a small size and suppresses the occurrence of problems during mounting.

According to the motor 1 of the present example embodiment, the shaft 21 includes the insertion portion 23 serving as the connecting portion that connects the threaded portion 22 and the flange portion 25 in the axial direction, and the insertion portion 23 has the non-circular cross section perpendicular to the center axis J. Thus, the shaft 20 can be mounted to the chassis plate 13 in the state of being restricted from rotating about the center axis J.

Since the flange portion 25 holds the bearing 4a, which rotates the rotor 3, on the outer circumferential surface according to the motor 1 of the present example embodiment, the flange portion 25 can also be used as the guide member that guides the bearing 4a.

Since the in-wheel motor adopts the outer rotor, it is necessary to cause the wiring connecting the inside and outside of the motor to pass through the site not affected by the rotation of the motor. For example, when the motor is large, it is possible to lead out a wiring to the outside through the inside of the shaft.

Meanwhile, in recent years, there is a demand for reduction in size of the in-wheel motor itself in order to reduce a size and weight of a carrier vehicle to which the in-wheel motor is mounted. When the in-wheel motor is reduced in size, however, the wiring is not allowed to pass through the inside of the shaft, and thus, it is necessary to lead out the wiring to the outside from a different site. Since an impact and a vibration from the ground are directly transmitted to the in-wheel motor in the carrier vehicle, it is necessary to maintain the mechanical strength of the in-wheel motor. Therefore, it has been desired to provide a new technique that achieves both the maintenance of mechanical strength and the reduction in size.

One aspect of the carrier vehicle according to an example embodiment of the present disclosure includes: a motor that has a stator, a shaft including a shaft portion extending along a center axis, and a flange portion provided on a radially outer side of the shaft portion of the shaft and having an opening through which a lead wire extending from the stator passes; and a main body to which the motor is mounted. The opening of the flange portion is positioned on the upper side of the center axis.

Since the opening 27 of the flange portion 25 is positioned on the upper side of the center axis J according to the carrier vehicle 100 of the present example embodiment as described above, an external force is applied to a portion where the opening 27 and the notch 28 are not provided in the flange portion 25 due to the vibration and the impact during traveling. The portion where the opening 27 and the notch 28 are not provided has a relatively higher mechanical strength than a portion where the opening 27 and the notch 28 are provided, and thus, is not easily affected by the external force. Therefore, it is possible to suppress the occurrence of the rotation failure of the motor 1 due to the deformation of the flange portion 25.

Therefore, the carrier vehicle 100 capable of being reduced in size while maintaining the mechanical strength can be provided.

Since the flange portion has the notch 28 connected to the opening 27 in the radial direction according to the carrier vehicle 100 of the present example embodiment, it is possible to cause the lead wires R1 and R2 to pass through the inside of the opening 27 via the notch 28 without causing the connectors R1t and R2t to pass through the opening 27 so that the shaft 20 can be pulled out to the one side in the axial direction even if the sizes of the connectors R1t and R2t provided at the distal ends of the lead wires R1 and R2 are larger than the size of the opening 27.

Since the notch 28 is positioned at the center of the opening 27 in the circumferential direction according to the carrier vehicle 100 of the present example embodiment, the circumferential lengths of the two thin portions 28a can be aligned. Therefore, the decrease in mechanical strength of the flange portion 25 can be suppressed.

According to the carrier vehicle 100 of the present example embodiment, the main body 101 includes the top plate 103 provided on the upper side of the motor 1, and the motor 1 is mounted to the main body 101 such that the distance from the opening 27 to the top plate 103 is minimized. Thus, it is possible to suppress the occurrence of the rotation failure of the motor 1 due to the deformation of the flange portion 25 generated when the outer shape is distorted by the external force.

The present disclosure also includes the following aspects:

Aspect 1

A motor including:

a shaft including a shaft portion extending along a center axis;

a first groove provided on an outer surface of the shaft portion so as to extend along the center axis;

a stator core having an insertion hole into which the shaft portion of the shaft is inserted; and a rotation restricting member which is inserted into at least the first groove to restrict rotation of the shaft with respect to the stator core.

Aspect 2

The motor according to Aspect 1, wherein the rotation restricting member is configured using a pin, the stator core further includes a second groove provided on an inner circumferential surface of the insertion hole, and the pin is inserted into the first groove and the second groove.

Aspect 3

The motor according to Aspect 1, wherein the rotation restricting member includes a columnar portion provided on an inner surface of the insertion hole.

Aspect 4

The motor according to any one of Aspects 1 to 3, further including a sensor substrate which detects a magnetic flux from a rotor rotating about the center axis, in which the sensor substrate is held on the shaft portion.

Aspect 5

The motor according to Aspect 4, wherein the sensor substrate includes a recess having an inner surface shape along an outer surface of the shaft portion, and a protrusion extending to a radially inner side from an inner surface of the recess.

Aspect 6

A motor including:

a stator;

a shaft including a shaft portion extending along a center axis;

a flange portion provided to overhang to a radially outer side of the shaft portion of the shaft and having an opening through which a lead wire extending from the stator passes; and a notch provided in the flange portion and connected to the opening in a radial direction.

Aspect 7

The motor according to Aspect 6, wherein the opening has a shape in which at least a radially inner side is formed along an outer surface of the shaft portion in a plan view from a direction along the center axis.

Aspect 8

The motor according to Aspect 7, wherein the opening has an oval shape curved along the circumferential direction.

Aspect 9

The motor according to Aspect 7 or 8, wherein the notch is positioned at a center of the opening in the circumferential direction.

Aspect 10

A motor including:

a stator;

a shaft including a shaft portion extending along a center axis;

a rotor rotating about the center axis;

a flange portion provided integrally with the shaft and overhanging to a radially outer side from an outer circumferential surface of the shaft portion; and a threaded portion provided on one side of the shaft in an axial direction, in which a surface, close to the threaded portion, of the flange portion is a flat surface.

Aspect 11

The motor according to Aspect 10, wherein the shaft has a connecting portion that connects the threaded portion and the flange portion in the axial direction, and the connecting portion has a non-circular cross section perpendicular to the center axis.

Aspect 12

The motor according to Aspect 10 or 11, wherein the flange portion holds a bearing, which rotates the rotor, on the outer circumferential surface.

Aspect 13

A carrier vehicle including:

a motor having a stator, a shaft including a shaft portion extending along a center axis, and a flange portion provided on a radially outer side of the shaft portion of the shaft and having an opening through which a lead wire extending from the stator passes; and a main body to which the motor is mounted, in which the opening is positioned above the center axis.

Aspect 14

The carrier vehicle according to Aspect 13, wherein the flange portion is provided with a notch connected to the opening in a radial direction.

Aspect 15

The carrier vehicle according to Aspect 14, wherein the notch is positioned at a center of the opening in the circumferential direction.

Aspect 16

The carrier vehicle according to Aspect 14 or 15, wherein the main body includes a top plate provided on an upper side of the motor, and the motor is mounted to the main body such that a distance from the opening to the top plate is minimized.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a shaft extending along a center axis;
a first groove, which is recessed in a radial direction and extends in an axial direction, on an outer side surface of the shaft;
a stator core into which the shaft is inserted; and
a rotation restrictor which is inserted into at least a portion of the first groove and restricts the stator core and the shaft in a circumferential direction.

2. The motor according to claim 1, wherein
the rotation restrictor includes a columnar pin;
the stator core includes an insertion hole into which the shaft is inserted, and further includes a second groove, which is recessed to a radially outer side and extends in the axial direction, on an inner circumferential surface of the insertion hole; and
the pin is inserted into the first groove and the second groove.

3. The motor according to claim 1, wherein the rotation restrictor includes a columnar portion provided on an inner surface of an insertion hole into which the shaft is inserted.

4. The motor according to claim 1, further comprising:
a sensor substrate that detects a magnetic flux from a rotor rotating about the center axis; wherein
the sensor substrate is held on the shaft.

5. The motor according to claim 4, wherein the sensor substrate includes a recess with an inner surface shape along an outer surface of the shaft, and a protrusion extending to a radially inner side from an inner surface of the recess.

6. The motor according to claim 1, further comprising
a lead wire extending from the stator; wherein
the shaft includes a shaft portion and a flange portion that overhangs to a radially outer side from one side of the shaft portion in the axial direction;
the flange portion includes an opening through which the lead wire passes; and
the opening includes a notch connected to an outer side surface of the flange portion.

7. The motor according to claim 6, wherein at least a portion of the opening on a radially inner side has a shape along an outer circumferential surface of the shaft portion in a plan view from a direction along the center axis.

8. The motor according to claim 6, wherein the opening has an oval shape curved along the circumferential direction.

9. The motor according to claim 6, wherein the notch is positioned at a center of the opening in the circumferential direction.

10. The motor according to claim 6, wherein a circumferential width of the notch does not exceed a circumferential width of the opening.

11. The motor according to claim 1, further comprising:
a rotor that rotates about the center axis; wherein
the shaft includes a threaded portion extending in the axial direction and a flange portion extending in the radial direction; and
a surface, close to the threaded portion, of the flange portion is a flat surface.

12. The motor according to claim 11, wherein
the shaft includes a connecting portion that connects the threaded portion and the flange portion in the axial direction; and
the connecting portion includes a non-circular cross section perpendicular to the center axis.

13. The motor according to claim 11, wherein the flange portion includes a holding portion, which holds a bearing rotating the rotor, on an outer circumferential surface.

14. A carrier vehicle equipped with the motor according to claim 6, wherein the opening of the motor is positioned above the center axis.

\* \* \* \* \*